United States Patent [19]
Wolfla et al.

[11] Patent Number: 5,951,892
[45] Date of Patent: Sep. 14, 1999

[54] METHOD OF MAKING AN ABRADABLE SEAL BY LASER CUTTING

[75] Inventors: Thomas Andrew Wolfla, Oklahoma City; James Joseph Ferguson, Edmond, both of Okla.

[73] Assignee: Chromalloy Gas Turbine Corporation, San Antonio, Tex.

[21] Appl. No.: 08/763,548

[22] Filed: Dec. 10, 1996

[51] Int. Cl.⁶ .................................................. B23K 26/00
[52] U.S. Cl. .............................. 219/121.69; 219/121.85; 277/415
[58] Field of Search .................................. 148/194, 196, 148/197; 219/121.69, 121.68, 121.67, 121.72, 121.85; 277/415; 415/173.4, 174.4

[56] References Cited

U.S. PATENT DOCUMENTS

| | | | |
|---|---|---|---|
| 3,042,365 | 7/1962 | Curtis et al. | 415/173.4 |
| 3,046,648 | 7/1962 | Kelly | 415/174.4 X |
| 3,716,357 | 2/1973 | Evans et al. | 75/252 |
| 3,719,365 | 3/1973 | Emmerson et al. | 277/415 |
| 3,765,867 | 10/1973 | Evans et al. | 75/252 |
| 3,914,507 | 10/1975 | Fustukian | 428/404 |
| 3,918,925 | 11/1975 | McComas | 29/182.3 |
| 3,920,410 | 11/1975 | Kunda et al. | 29/192 |
| 4,291,089 | 9/1981 | Adamovic | 428/325 |
| 4,299,860 | 11/1981 | Schaefer et al. | 427/53.1 |
| 4,337,951 | 7/1982 | Perego | 277/415 |
| 4,349,313 | 9/1982 | Munroe et al. | 415/174 |
| 4,374,173 | 2/1983 | Adamovic | 428/325 |
| 4,377,371 | 3/1983 | Wisander et al. | 415/173.4 |
| 4,546,047 | 10/1985 | Ryan | 428/565 |
| 4,566,700 | 1/1986 | Shiembob | 277/53 |
| 4,606,948 | 8/1986 | Hajmrie et al. | 427/423 |
| 4,664,973 | 5/1987 | Otfinoski et al. | 428/307.3 |
| 4,696,855 | 9/1987 | Pettit et al. | 428/312.8 |
| 4,759,957 | 7/1988 | Eaton et al. | 427/226 |
| 4,884,820 | 12/1989 | Jackson et al. | 277/415 |
| 4,936,745 | 6/1990 | Vine et al. | 415/173.4 |
| 5,017,402 | 5/1991 | McComas | 427/34 |
| 5,024,884 | 6/1991 | Otfinoski | 428/328 |
| 5,122,182 | 6/1992 | Dorfman et al. | 75/252 |
| 5,262,206 | 11/1993 | Rangaswamy et al. | 427/447 |
| 5,352,540 | 10/1994 | Schienle et al. | 428/623 |
| 5,453,329 | 9/1995 | Everett et al. | 428/565 |
| 5,630,980 | 5/1997 | Arndt et al. | 264/400 |

OTHER PUBLICATIONS

ASM Handbook vol. 16; pp. 572–576; 894–901, 1989.
Sherritt Technologies, "Specialty Metal Powders", Oct. 1992.

*Primary Examiner*—Gregory Mills
*Attorney, Agent, or Firm*—Mitchell D. Bittman

[57] ABSTRACT

An abradable seal is provided utilizing a laser to cut a pattern into the surface effective to improve abradability in the area of the pattern.

13 Claims, 5 Drawing Sheets

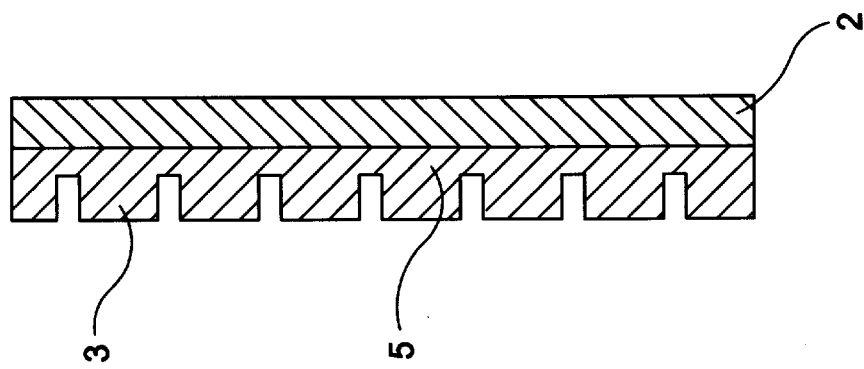
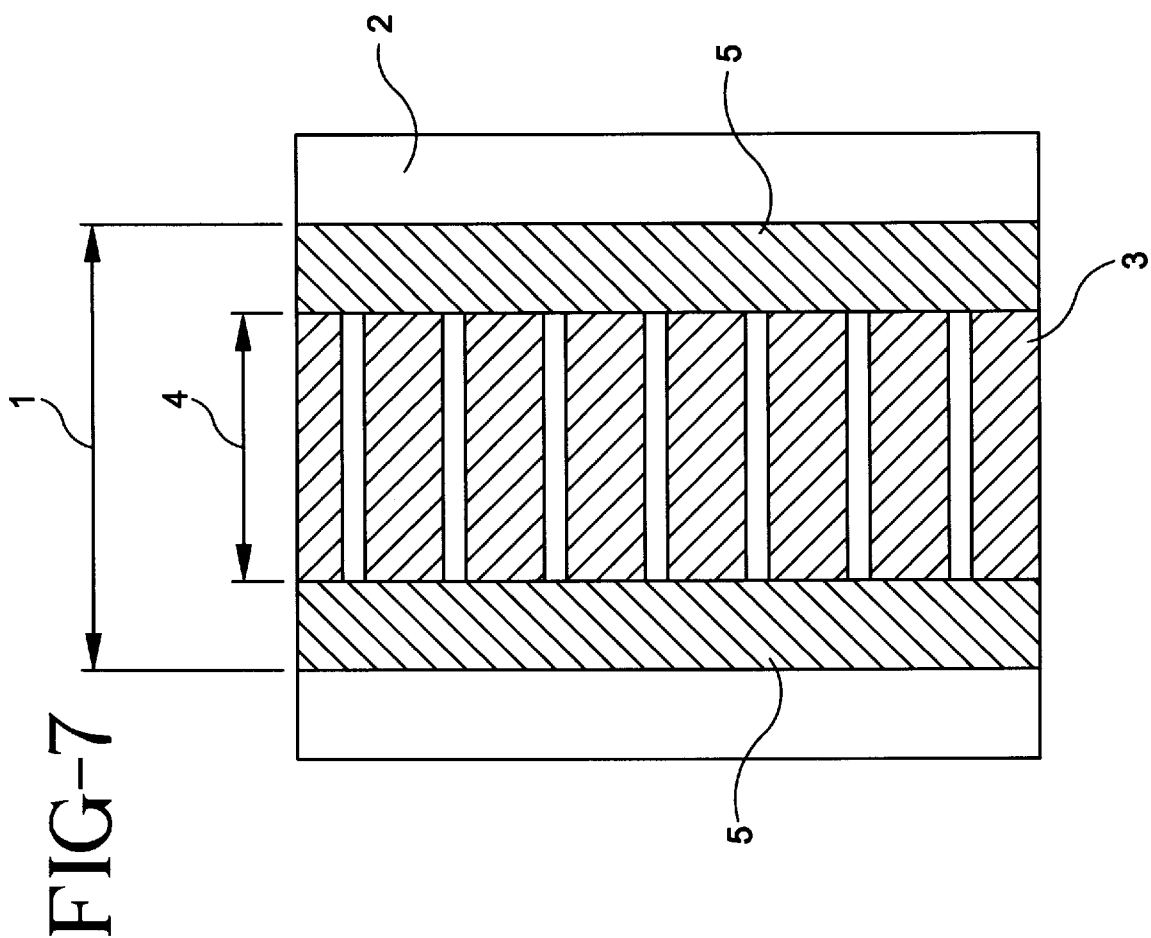

METHOD OF MAKING AN ABRADABLE SEAL BY LASER CUTTING

BACKGROUND OF THE INVENTION

This invention relates to abradable seals, more particularly to the use of a laser to texture the surface of a seal material to provide improved abradability.

The efficiency of modern gas turbine engines depends upon a tight seal between the rotating components (blades) and the stationary component (shroud) in the fan, compressor and turbine. This seal is established by allowing the blades to cut (abrade) a groove in an abradable seal material which prevents a substantial volume of air from leaking past the blade tip. Traditionally the seal materials have been fabricated from woven metallic fibers or sintered metallic particles and brazed in place. While these materials are easily abraded due to their high internal porosity and low strength, their resistance to particle erosion is poor which results in rapid loss of material. This loss of material degrades the seal and the efficiency of the engine rapidly decreases. Seal materials in the more advanced engine utilize thermal sprayed coatings which perform the same function as the braided abradable seals, but which are easier to apply and easier to replace when an engine is overhauled. The properties of these sprayed seals can be varied to either maximize erosion resistance or maximize abradability. However, it has not been possible to maximize these two properties simultaneously.

The use of thermal spray powders to form abradable seals is known in the art as shown by U.S. Pat. No. 4,291,089. Such powders are used to form a coating on a substrate to provide an abradable seal, that is to say a coating which seals the space between the substrate and an adjacent surface movable relative thereto, and which is abraded to a controlled extent by relative movement between the substrate and the adjacent surface. Such a seal is initially formed by thermal spraying a powder onto the substrate to form a coating with a slightly greater thickness than the spacing between the substrate and the adjacent surface, so that the coating is abraded by relative movement between the substrate and the adjacent surface to a slightly lesser thickness corresponding to the spacing between the substrate and the adjacent surface so as to provide an efficient seal there between. Such seals are used for example on turbine or compressor blades of gas turbine engines, such as those used in aircraft, to provide a seal between the blades and the turbine or compressor housing.

One of the problems in providing a suitable abradable seal is to produce a thermally sprayed coating which, on the one hand has sufficient structural strength which nevertheless is low enough to provide abradability, and which, on the other hand, has a sufficiently high resistance to erosion by particles impinging on the abradable seal coating during use. For example, in the case of gas turbine or compressor blades, the seal coating is subjected to impingement by abrasive particles entrained in the air and ingested by the engine.

In one type of powder used to form abradable seal coatings, each powder particle has a central core of non-metallic solid material surrounded by a layer of metallic material, as described for example in U.S. Pat. No. 3,914,507. Such powders are known as composite powders, with the powder particles being known as composite powder particles. One composite powder of this kind which has been suggested has particles each having a core surrounded by nickel or nickel alloy, and abradable seal coatings formed by thermal spraying such powders have been useful as abradable seal coatings on compressors and turbines of aircraft gas turbine engines.

SUMMARY OF THE INVENTION

Briefly, this invention provides an abradable seal and a process for preparing an abradable seal comprising cutting a pattern with a laser into the surface of an abradable seal material effective to provide improved abradability in the area of the pattern.

BRIEF DESCRIPTION OF THE DRAWINGS

Embodiments of this invention will now be described, by way of example, with reference to the accompanying drawings, of which:

FIGS. 7, 8, 9, and 10 are embodiments of alternative patterns with FIG. 7 showing a top plan view of striped pattern with FIG. 8 a cross sectional view of FIG. 7, and FIG. 9 showing a top plan view of a slanted striped pattern with FIG. 10 a cross sectional view of FIG. 9.

DETAILED DESCRIPTION OF THE INVENTION

An abradable seal is prepared with the use of a laser to cut a pattern into the surface of an abradable seal material. Laser texturing provides a means of modifying the surface of an abradable seal material which has good erosion resistance, but requires improved abradability in the area. This surface modification is a pattern, for example of closely spaced holes, a cross hatch pattern, a tubular cell pattern, a striped or slanted striped pattern, a pattern of lines running perpendicular or parallel to the seal or other patterns which also enhance abradability. Various patterns are shown in the Figures. The texturing could also be accomplished across the width of the seal contact area to further enhance the abradability in the area. This invention allows an erosion resistant abradable seal material to be modified to incorporate good abradability in the same product. Existing abradable seals do not possess these characteristics.

The abradable seal material can be a thermal spray coating, or a prefabricated sheet (panel) which is attached to a component by sintering or brazing, or other materials as are known in the art. Advantageously a more erosion resistant seal material can be utilized since by this invention improved abradability can be imparted to this material by laser texturing. Gas turbine engine components are typically of a nickel-based, cobalt-based, iron-based or titanium based alloy. The abradable seal material can also be of an aluminum-based, titanium-based, iron-based, nickel-based or cobalt-based alloy or can be made of erosion resistant materials including NiCr alloys, NiCrAl alloys, FeCr, CoCr, FeCrAl, CoCrAl, or MCrAlY alloys where M could be Fe, Ni or Co, oxides, nitrides, borides, sulphides, silicides and intermetallics. It is even possible to utilize the component surface itself as the abradable seal material. In one embodiment the abradable seal material can also contain non-metallic particles, including boron nitrides, bentonite, oxide, nitride, borides, silicides, intermetallics, and non metallics e.g. plastics, polymers etc.

Figure 1:
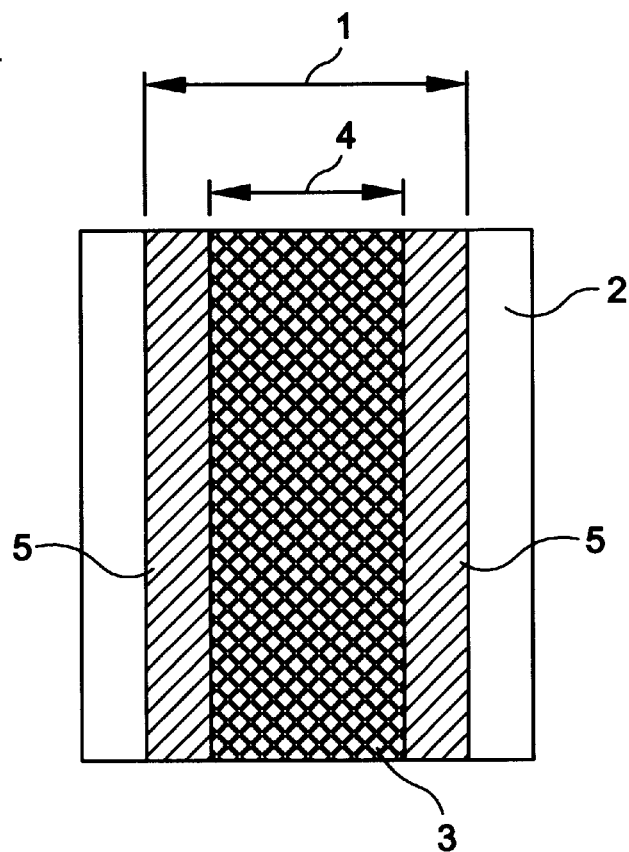
FIGS. 1, 2, and 3 are drawings of a gas turbine engine compressor shroud ring having an abradable seal coating thereon with a cross hatched pattern, with FIG. 1 being a top plan view, FIG. 2 being a side plan view and FIG. 3 an enlarged portion of the abradable seal from FIG. 2.
Figure 2:
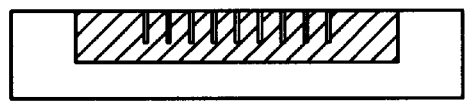
Figure 3:
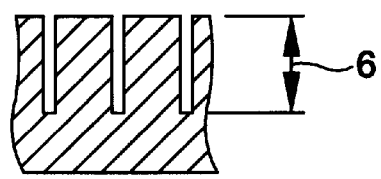
Figure 4:
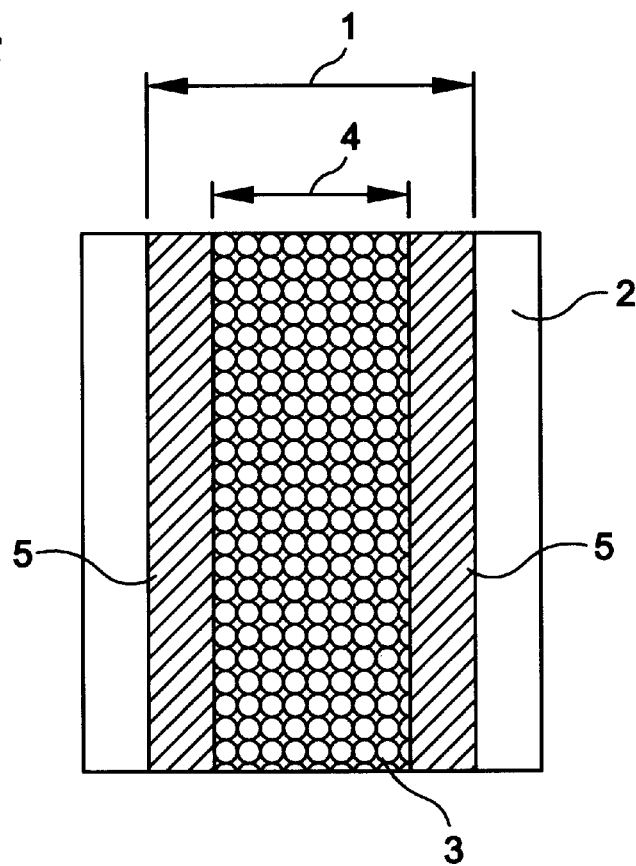
FIGS. 4, 5, and 6 are drawings of a gas turbine engine compressor shroud ring having an abradable seal coating thereon with a tubular cell pattern, with FIG. 4 being a top plan view, FIG. 5 being a side plan view and FIG. 6 an enlarged portion of the abradable seal from FIG. 5.
Figure 5:
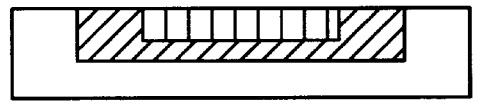
Figure 6:
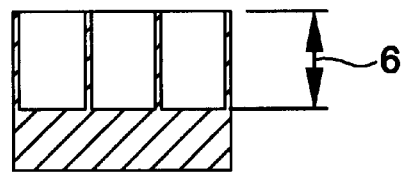
Figure 10:
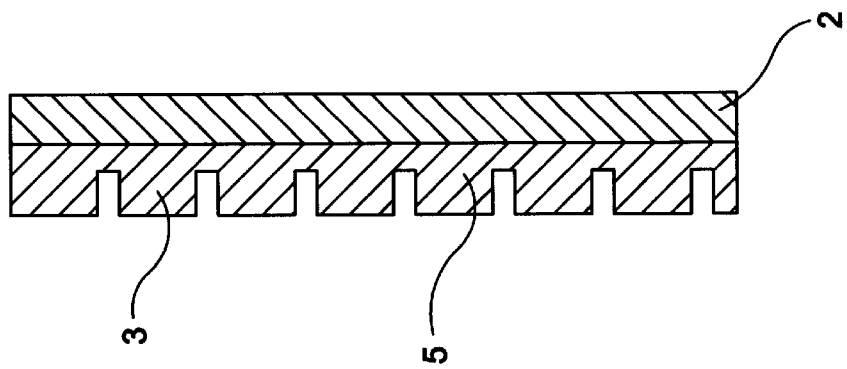
Figure 9:
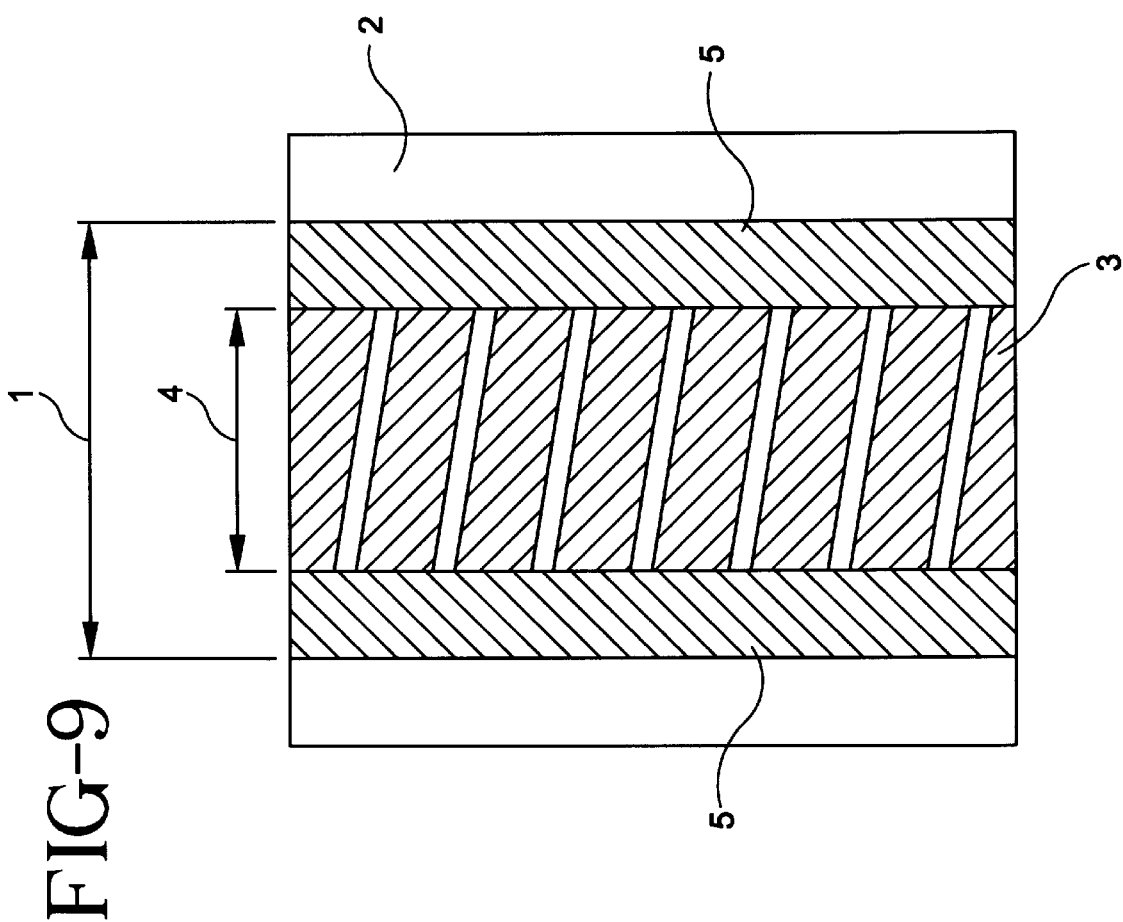

Laser texturing is used to cut into the surface of the abradable seal material a pattern which will impart improved abradability to the material. Various patterns are effective including circles, cross hatches and stripes as shown in FIGS. 1–10. FIGS. 1–3 show use of a cross-hatched pattern cut into the abradable seal material. FIGS. 3–6 show a tubular cell (circles) pattern while FIGS. 7–10 show stripes cut into the surface. The selection of the specific pattern is dependent on the particular seal material and the degree of abradability required. The pattern is also cut into the material in the area and to a depth that the blade is expected to cut (abrade) during operation. Typically the depth of the pattern would be from about 0.01 to 0.1 inches, while the width of the pattern can vary depending upon the blade and can be from 0.125 to 24 inches. In one embodiment, uncut material (i.e. no pattern) remains on two sides of the pattern, i.e. on the edges of the expected blade path, to provide increased erosion resistance during operation of the gas turbine engine. In the Figures the abradable seal material 1 is shown on a shroud ring 2 of a compressor with a pattern 3 being cut into the area of the blade path 4. Additional areas of uncut (no pattern) abradable seal material 5 is shown on both sides of the pattern 3. In FIGS. 3 and 6 the depth 6 of the pattern corresponds with the expected depth of blade incursion.

A standard laser may be used to cut the pattern. A typical laser is a Raytheon SS550 YAG laser equipped with a 5 axis motion controller operated at approximately 0.5 kilowatt.

EXAMPLE 1

The surface of a 304 stainless steel plate approximately 1.5 inches wide and 4 inches long and 0.100 thick was mechanically roughened using 60 mesh aluminum oxide in an aspirated grit blast cabinet. The plate was thermal sprayed coated with a bondcoat of Ni-5 wt % Al to a thickness of 0.004–0.006 inches thick. The surface of the bondcoat was then thermal sprayed coated with NiCrAl bentonite (an abradable coating) to a thickness of approximately 0.150 inches. The surface of the abradable coating was machined to produce a surface which was essentially flat and uniform in surface roughness.

Figure 11:
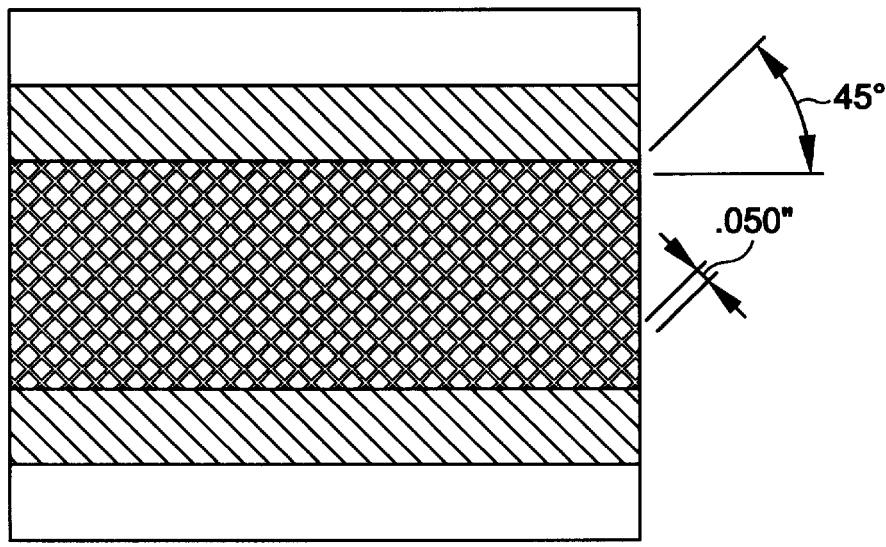
FIG. 11 shows a top plan view of a pattern produced by Example 1.

The coated plate was mounted in the jaws on the computer controlled X-Y table of the laser. A computer program was written and loaded in the computer which produced a diagonal traverse pattern at approximately 45° and separated by about 0.050 inches as shown in FIG. 11. The laser was energized and allowed to engrave the surface of the abradable coating to a depth of approximately 0.050 inches.

EXAMPLE 2

The surface of a 304 stainless steel plate approximately 1.5 inches wide and 4 inches long and 0.100 thick was mechanically roughened using 60 mesh aluminum oxide in an aspirated grit blast cabinet. The plate was thermal sprayed coated with a bondcoat of Ni-5 wt % Al to a thickness of 0.004–0.006 inches thick. The surface of the bondcoat was then thermal sprayed coated with NiCrAl bentonite (an abradable coating) to a thickness of approximately 0.150 inches. The surface of the abradable coating was machined to produce a surface which was essentially flat and uniform in surface roughness.

Figure 12:
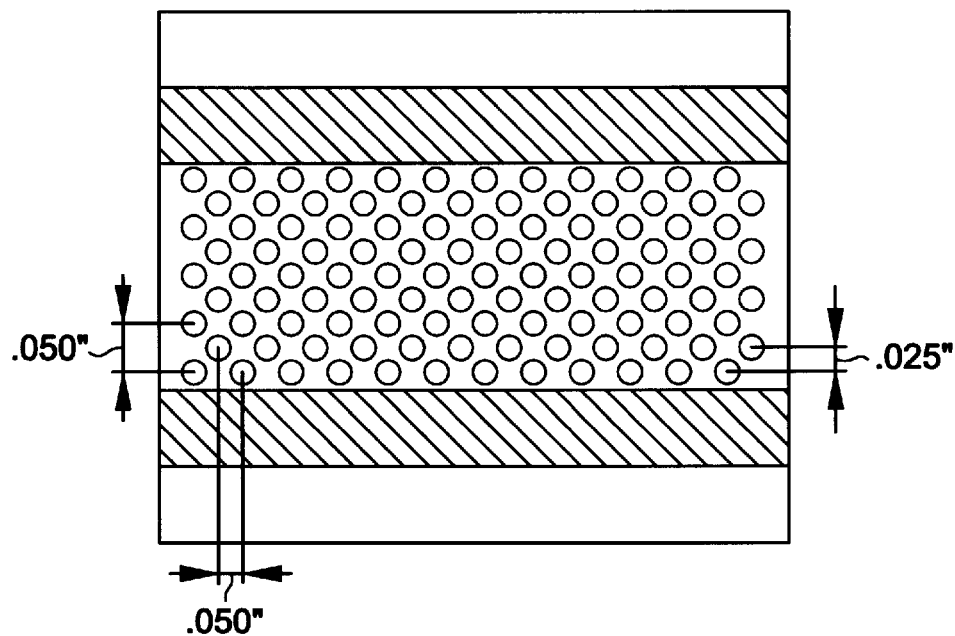
FIG. 12 shows a top plan view of a pattern produced by Example 2.

The coated plate was mounted in the clamping fixture on the computer controlled X-Y table of the laser. A program was written and loaded in the computer which produced a motion which moved the coated plate in a linear manner across the surface. The motion was stopped every 0.050 inches and activated the laser to fire. At the end of the traverse length the plate was indexed 0.050 inches in the perpendicular direction and an offset of 0.025 inches was incorporated in the traverse in order to place the next row of holes in between the previous row. This pattern was repeated until the surface was completely traversed and engraved with the pattern shown in FIG. 12. The holes produced were spaced approximately 0.050 inches and were approximately 0.050 inches deep.

What is claimed:

1. A process for preparing an abradable seal for a component comprising:

cutting a pattern with a laser into the surface of an abradable seal material effective to provide improved abradability in the area of the pattern, wherein said abradable seal material seals the space between the component and an adjacent surface moveable relative thereto by being abraded by relative movement between the component and the adjacent surface and wherein the pattern is in an area and to a depth which the adjacent surface will abrade in creating a seal.

2. Process of claim 1 further comprising:

applying an abradable seal material to the component with the pattern being cut into the surface of the seal material.

3. Process of claim 2 wherein the component and the abradable seal material are metallic.

4. Process of claim 3 wherein the component is a gas turbine engine component and is an alloy selected from the group consisting of a nickel-based, cobalt-based, iron-based, aluminum-based and titanium-based alloys.

5. Process of claim 4 wherein the abradable seal material is an alloy selected from the group consisting of iron-based alloys, aluminum-based alloys, titanium-based alloys, nickel-based alloys, cobalt-based alloys, NiCr alloy, NiCrAl alloy and MCrAlY alloys where M is selected from the group consisting of Fe, Ni or Co or mixtures thereof.

6. Process of claim 5 wherein the abradable seal material contains non-metallic particles.

7. Process of claim 6 wherein the non-metallic particles are selected from the group consisting of boron nitride, bentonite, oxides, nitrides, borides, silicides, intermetallics, plastics and polymers.

8. Process of claim 4 wherein the adjacent surface is a blade.

9. Process of claim 8 wherein the depth of the pattern is within the range of about 0.01 to 0.1 inches.

10. Process of claim 9 wherein the pattern is selected from the group consisting of closely spaced holes, cross hatch, stripes, and lines perpendicular or parallel to the seal.

11. Process of claim 8 wherein there is uncut seal material on two sides of the pattern.

12. Process of claim 4 comprising applying the abradable seal material by thermal spraying a metallic alloy powder.

13. Process of claim 4 comprising applying the abradable seal material by attaching a sheet of seal material to the component.

* * * * *